United States Patent [19]
Welch et al.

[11] Patent Number: 6,159,888
[45] Date of Patent: Dec. 12, 2000

[54] POLYMERIZATION CATALYST SYSTEMS, THEIR PREPARATION, AND USE

[75] Inventors: M. Bruce Welch, Bartlesville, Okla.; Alexander Köppl; Helmut G. Alt, both of Bayreuth, Germany

[73] Assignee: Phillips Petroleum Company, Bartlesville, Okla.

[21] Appl. No.: 09/150,462

[22] Filed: Sep. 9, 1998

[51] Int. Cl.[7] .............................. B01J 21/00; B01J 21/02; B01J 21/04; B01J 21/06; B01J 21/08

[52] U.S. Cl. .......................... 502/117; 502/103; 502/152; 502/158; 556/52; 556/53; 556/56; 526/126; 526/127; 526/129

[58] Field of Search ..................... 502/117, 103, 502/152, 158; 556/53; 526/126, 127, 129, 64, 160, 904, 905

[56] References Cited

U.S. PATENT DOCUMENTS

| | | | |
|---|---|---|---|
| 5,565,592 | 10/1996 | Patsidis et al. | 556/11 |
| 5,587,501 | 12/1996 | Winter et al. | 556/53 |
| 5,747,408 | 5/1998 | Commereuc | 502/171 |
| 5,807,938 | 9/1998 | Kanecko et al. | 526/160 |
| 5,834,393 | 11/1998 | Jacobsen et al. | 502/152 |

OTHER PUBLICATIONS

U.S. Ser. No. 955,219, filed Oct. 20, 1997.

*Primary Examiner*—Mark L. Bell
*Assistant Examiner*—Michael J. Di Verdi
*Attorney, Agent, or Firm*—Edward L. Bowman

[57] ABSTRACT

A prepolymerized solid catalyst is prepared by reacting a suitable support base with an organoaluminum compound and then reacting that product with an activity promoting amount of water and then reacting the resulting solid cocatalyst with a metallocene and then subjecting that product to prepolymerization in the presence of hydrogen. The prepolymerized solid catalyst is useful in the polymerization of olefins.

19 Claims, No Drawings

POLYMERIZATION CATALYST SYSTEMS, THEIR PREPARATION, AND USE

FIELD OF THE INVENTION

This invention relates to the polymerization of olefins. In another aspect this invention relates to metallocene based catalyst systems for the polymerization of olefins. The invention is particularly related to a method for preparing a solid catalyst suitable for polymerizing olefins.

BACKGROUND OF THE INVENTION

The discovery that metallocenes of transition metals can be used as catalysts for the polymerization of olefins has led to significant amounts of research since it was found that different metallocenes could produce different types of polymers. One of the earliest references to the use of metallocenes in the polymerization of olefins is U.S. Pat. No. 2,827,446 which discloses a homogeneous, i.e. liquid, catalyst system of bis(cyclopentadienyl) titanium dichloride and an alkyl aluminum compound. The activity of such systems was not, however, as high as would be desired. It was latter discovered that more active catalyst systems would result if the metallocene was employed with an alkylaluminoxane cocatalyst, such as that disclosed in U.S. Pat. No. 3,242,099. One drawback of such metallocene-based catalyst system is that they generally must be used with large amounts of alkylaluminoxane cocatalysts, which are significantly more expensive than the alkyl aluminum cocatalysts. There is therefore a need for cocatalysts that would be effective in smaller amounts.

Various techniques are known for producing alkylaluminoxane, the simplest being to add water in a controlled fashion to an alkylaluminum compound such as disclosed in the aforementioned U.S. Pat. No. 3,242,099. Other techniques for producing such aluminoxanes involve reacting alkylaluminum compounds with solids containing water. See, for example, EPC 208,561; USSR Inventor Certificate 566,844: JP 60/289223; and U.S. Pat. Nos. 4,544,762; and 4,665,208.

For many commercial processes it is necessary to develop solid catalysts that are suitable for the particular type of commercial scale equipment employed. U.S. Pat. No. 4,431,788 teaches that a catalyst system can be prepared by reacting a solid having labile hydrogen atoms, such as starch, with an aluminum alkyl and then combining that product with a metallocene. Similarly German patent 3,240,382 teaches reacting alkyl aluminum compounds with solids containing water to produce solids coated with alkylaluminoxanes. Examples of other supported cocatalysts prepared by reacting organoaluminum compounds with solids containing water are disclosed in EPC 386,644; and U.S. Pat. Nos. 4,904,631; 4,912,075; 4,925,821; 5,006,500; 5,008,228; and 5,529,965.

The presence of soluble aluminoxane or polymerization catalyst, even on solid catalyst systems, has also been found to often be detrimental in commercial slurry type polymerization processes, the thought being that when the aluminoxane and/or polymerization catalyst is present in a dissolved form it contributes to the formation of fouling in the polymerization reactors. Accordingly, merely depositing aluminoxane on a solid support has not been found to be a particularly beneficial technique for preparing a catalyst system for slurry type polymerization processes, as some remaining soluble species usually result in reactor fouling.

A copending commonly owned U.S. patent application discloses a new type of catalyst system which uses a solid cocatalyst prepared by reacting a suitable support base with an organoaluminum compound and then reacting that product with an activity promoting amount of water. The solid catalyst is prepared by combining the solid cocatalyst with an olefin polymerization catalyst such as a metallocene and then conducting a prepolymerization to produce a solid catalyst system. The present invention is concerned with an improvement of that invention.

SUMMARY OF THE INVENTION

In accordance with one aspect of the present invention there is provided a method for polymerizing an olefin using a solid catalyst system. The catalyst system is prepared by combining a metallocene olefin polymerization catalyst with a solid cocatalyst and conducting a prepolymerization in the presence of hydrogen. The solid cocatalyst is prepared by reacting a suitable support base with an organoaluminum compound and then reacting that product with an activity promoting amount of water.

DETAILED DESCRIPTION OF THE INVENTION

In accordance with the present invention an organoaluminum compound is reacted with a suitable support base or carrier in a liquid diluent and then with water to produce a solid which can be used as a cocatalyst for transition metal olefin polymerization catalysts.

The terms "support base", "support", and "carrier" as used herein refer to the material that produces a solid when reacted with the organoaluminum compound and water. The support base thus does not have to actually be a solid. The term "base" in the phrase "support base" does not refer to the pH but just to the material which is the center upon which the solid cocatalyst is formed. It is contemplated that the support base can be any organic, organometallic, or inorganic compound capable of affixing the organoaluminum compound either through absorption, adsorption, Lewis Acid/Lewis Base interactions, or by reaction with hydroxyl groups of the support base.

A wide range of materials can be used as the support base. Generally, any material that will result in a solid cocatalyst that remains insoluble in the polymerization diluent during the polymerization process can be employed as the support base. Thus the support base includes materials that form solids when reacted with an organoaluminum compound and water as well as solids that are insoluble in the particular liquid diluent that is present during the polymerization. It is generally preferred that the support base be capable of yielding a particulate solid cocatalyst. The support base can be a material having surface groups which are known to react with organoaluminum compounds or a material which is free of surface groups which react with organoaluminum compounds. Some examples of materials envisioned for use as a support base include starch, lignin, cellulose, sugar, silica, alumina, silica-alumina, titania, zirconia, zeolites of silica and/or alumina, magnesia, calcium carbonate, aluminum trifluoride, boron oxide, magnesium dichloride, boric acid, activated carbon, carbon black, organoboranes, organoboroxines, Si(OMe)$_3$Me, hydrocarbyl polyalcohols, boric acid, alumina, polyethylene, polyethylene glycol, and the like. One embodiment comprises dissolving polyethylene in a suitable organic solvent then adding the organoaluminum compound and then adding the water to produce a solid cocatalyst. It is generally preferred that the support base that is reacted with the organoaluminum compound be relatively free of water, i.e. that it contain less than about 5 weight percent water, more preferably less than 1 weight percent water.

The term organoaluminum compound as used herein refers to compounds of the formula $R_n AlX_{3-n}$ wherein n is a number in the range of 1 to 3, each R is the same or different organo radical, preferably a hydrocarbyl radical, and each X is a halide. Typically the organo radicals would have 1 to 12 carbon atoms, more preferably 1 to 5 carbon atoms. Some examples of organoaluminum compounds include trialkylaluminum compounds, triarylaluminum compounds, dialkylaluminum hydrides, diarylaluminum hydrides, aryl alkyl aluminum hydrides, dialkylaluminum halides, alkyl aluminum dihalides, alkyl aluminum sesquihalides, and the like. Some specific examples of such organoaluminum compounds include trimethylaluminum, triethylaluminum, dimethylaluminum chloride, triisopropylaluminum, triisobutylaluminum, trihexylaluminum, diethylaluminum chloride, ethyl aluminum dichloride, ethyl aluminum sesquichloride, dimethyl aluminum chloride, and the like. The currently preferred organoaluminum compounds are the alkyl aluminum compounds, especially the trialkyl aluminum compounds, with trimethyl aluminum being particularly preferred. It is also within the scope of the present invention to use mixtures of such organoaluminum compounds.

The organoaluminum compound is contacted with the support in a suitable organic liquid diluent. Preferably the organic liquid diluent is anhydrous, i.e. substantially free of water. Examples of what is meant by organic liquid include hydrocarbons such heptane, octane, decane, dodecane, kerosene, cyclopentane, cyclohexane, methylcyclopentane, benzene, toluene, and xylene as well as halogenated compounds such as chlorobenzene and the like, as well as mixtures thereof. It is within the scope of the invention to simply admix the support and a liquid diluent solution of the organoaluminum compound. Another option is to add a solution of the organoaluminum compound to a slurry of the support base in a liquid diluent.

The amount of liquid diluent employed can vary over a wide range. Typically the amount of liquid, including liquid accompanying the added organoaluminum compound, would be in the range of about 0.1 to about 5000 ml/gram of support or more often about 5 to about 200 ml/gram of support. The amount of the organoaluminum compound relative to the support base can vary over a wide range depending upon the particular material selected as the support base and the particular results desired. The amount necessary to provide the greatest yield of the most active cocatalyst for a specific support and a specific organoaluminum compound can be readily determined by routine experimentation. A typical range for the amount of the organoaluminum compound would be from about 0.0001 moles/gram of support base to about 1 mole/gram of support base.

The temperature at which the organoaluminum compound and the support base are contacted can vary over a wide range. Typically it would be carried out at a temperature in the range of about $-50°$ C. to about the boiling point of the liquid diluent, generally in the range of about $-50°$ C. to about $200°$ C. It is currently preferred to carry out the contacting at a temperature in the range of about 10 to about $100°$ C. Higher temperatures can speed up the process for producing the solid cocatalyst. Higher pressures can allow for the use of higher temperatures.

After the contacting of the support base with the organoaluminum compound is complete the resulting solution or slurry is contacted with water. This is the most critical step of producing the solid cocatalyst. The water can be introduced in any convenient manner. For example, a slurry of water in a hydrocarbon can be added or water can just be added directly to the slurry. Other options would include adding ice or adding a solid containing water. Preferably, for safety reasons the water is added slowly while the slurry is agitated as by stirring. It is currently preferred to introduce the water into the slurry as a gas, preferably in an inert carrier gas such as nitrogen or argon. The introduction of the water via an inert carrier gas has been found to result in a more uniform distribution of the cocatalyst components on the surface of the support base. The temperature employed during the water addition can vary over a wide range depending upon the technique being employed but is typically in the range of about $-100°$ C. to about $100°$ C. In a preferred embodiment, in which the water is added to the slurry via an inert gas, the gas is passed through a heated vessel containing water and is then passed into the vessel containing the slurry, which is also preferably heated.

The amount of water necessary to improve the activity of the resulting cocatalyst can vary. That amount is referred to herein as an activity promoting amount. The amount necessary to obtain an improvement in activity can vary depending upon the particular support selected, the amount of organoaluminum compound employed, and the amount of groups on that support which will react with the organoaluminum compound. The optimum amount of water to be added for a particular support can be readily determined by routine experimentation. Generally the water will be employed in an amount such that the molar ratio of added water to the aluminum of the organoaluminum compound will be in the range of about 0.1/1 to about 3/1, more preferably the range for the molar ratio of the water to the aluminum of the organoaluminum compound is in the range of about 0.2/1 to about 1.5/1, or even still more preferably about 0.5/1 to about 1.2/1. The reaction time can range from a few minutes to several hours and can often be monitored by observing the temperature and/or the evolution of gases.

After the reaction with the water has been completed the resulting solid product is combined with a metallocene catalyst and subjected to prepolymerization in the presence of hydrogen.

The term metallocene catalyst as used herein includes to organometallic compounds of the formula:

$$(L)_m M(A)_n$$

wherein each L is a bulky organo ligand, each A is a replaceable group, M is a transition metal selected from Groups III–VI and VIII of the Periodic Table including the lanthanide and actinide metals, and m and n are integers such that the total ligand valency corresponds to the valence of M. The ligands L and A may be bridged to each other, and if two L and/or A ligands are present they may also be bridged. The metallocene compound may be full-sandwich bonded having two or more ligands each having a cyclopentadienyl structure or half-sandwich compounds having only one ligand having a cyclopentadienyl structure. Preferably at least one ligand L has a multiplicity of bonded atoms, preferably carbon atoms, and a cyclic structure such as a cyclopentadienyl ligand or any other ligand capable of eta-5 bonding to M. Examples of typical removable groups A include halides such as chloride, hydrocarbyls such as phenyl or alkyl, or other univalent anionic ligands. The term metallocene as used herein thus includes the catalysts of the type disclosed in U.S. Pat. No. 5,055,438, the disclosure of which is incorporated by reference. A currently preferred type of metallocene is a bridged sandwich bonded metallocene having polymerizable substituents such as those covered by the claims of U.S. Pat. No. 5,565,592 which is incorporated herein by reference.

The olefin polymerization catalyst systems can be prepared by simply adding a metallocene catalyst to the slurry resulting from the production of the cocatalyst, or the solids of the slurry can be filtered and optionally washed and then combined with the metallocene catalyst, or the liquid of the slurry can be evaporated and the resulting solids then combined with the metallocene catalyst to form the solid catalyst system. Typically, the metallocene catalyst is combined with the solid cocatalyst in a liquid diluent, preferably a liquid diluent in which the catalyst is soluble. The resulting catalyst system can be prepolymerized directly or it can be separated from the liquid and then prepolymerized. Such a recovered solid catalyst system can be washed with a hydrocarbon, preferably an aliphatic hydrocarbon, and dried, preferably under a high vacuum before being prepolymerized.

The amount of the polymerization catalyst that is combined with the inventive cocatalyst can vary over a wide range depending upon the particular catalyst and cocatalyst selected and the particular results desired. Typically the polymerization catalyst is employed in such an amount that the atomic ratio of the Al of the cocatalyst to the metal of the polymerization catalyst is in the range of about 1/1 to about 10000/1, more preferably about 10/1 to 1000/1.

The temperature at which the polymerization catalyst and the inventive cocatalyst are combined is not considered to be particularly critical. Typically this is done at temperatures in the range of about −50° C. to about 300° C., or more preferably about 0° C. to about 100° C., or still more preferably about 10° C. to about 80° C. . Typically the catalyst system can be employed shortly after the inventive cocatalyst and the polymerization catalyst are brought together.

The prepolymerization can be conducted using olefins such as those normally polymerized by the polymerization catalysts. The currently preferred olefin being ethylene either alone or in combination with alpha olefins such as propylene, butene, 1-hexene, 4-methyl-1-pentene, and the like. It is currently preferred that the metallocene have at least one polymerizable substituent. The prepolymerizations can be conducted under a wide range of conditions, typically it is preferred to conduct the prepolymerization in a liquid diluent at temperatures in the range of about −15° C. to about 200° C., more typically about 0° C. to about 100° C. The amount of prepolymerization conducted can vary; however, typically would be such that the prepolymer would be in the range of from about 1 to about 95 weight percent of the resulting prepolymerized catalyst system, more preferably about 5 to 80 weight percent.

In a currently preferred embodiment a prepolymerized catalyst system is prepared by reacting the support with the organometallic compound in a liquid diluent, then adding the water to that slurry, then after the reaction is substantially complete adding the metallocene to the slurry, then the slurry is contacted with an olefin under prepolymerization conditions in the presence of hydrogen to produce a prepolymerized solid catalyst system which can be used as is in the slurry or separated from the liquid and dried for subsequent use in a polymerization. While the dried catalyst system can be subjected to washing with a hydrocarbon before being used in a subsequent polymerization, it has been noted that more active catalyst systems in terms of grams of polymer per gram of transition metal result if there is no such washing step.

It is contemplated that the catalyst systems of the present invention can be employed in generally any type of polymerization where similar catalysts have been employed in the past. The catalysts are considered to be particularly well suited for slurry type polymerization processes. The conditions employed when using the catalyst systems of the present invention can be the same as those used with prior art systems. Typically when the polymerization is carried out in the presence of a liquid the polymerization will be conducted at a temperature in the range of about −50° C. to about 300° C. and the pressure will be from about normal atmospheric pressure to about 2000 kg/cm$^3$. In some cases it may be desirable to add some additional organoaluminum compound to the polymerization vessel, such as triethyl aluminum or triisobutylaluminum as a poison scavenger.

A further understanding of the present invention, its objects, and advantages will be provided by the following examples.

EXAMPLE I

Non-Prepolymerized Catalyst System I

A catalyst system was prepared by combining 30 mL of a two molar trimethylaluminum solution and toluene with a suspension of 2 gm of calcine silica gel in 100 mL of toluene at room temperature. Then 0.75 mL of water was bubbled through the suspension as steam over 15 minutes using a water saturated argon flow. The reaction mixture heated itself to 60° C. After about 10 minutes, the suspension became suddenly highly viscous. After cooling to room temperature, the mixture was stirred vigorously for 2 hours. Then 0.23 millimoles of 5-(cyclopentadienyl)-5-(9-fluorenyl)-1-hexene zirconium dichloride was added and the mixture stirred for 5 minutes. The resulting mixture was then filtered and dried under a high vacuum.

EXAMPLE II

Prepolymerized Catalyst System II

A solid catalyst system was prepared using a technique analogous to that described in Example I, however, an ethylene pressure of 0.1 bar was applied to 15 minutes at 25° C. prior to the filtration of the catalyst suspension. The resulting prepolymerized catalyst was then filtered and dried under a high vacuum.

EXAMPLE III

Prepolymerized Catalyst System III

A catalyst was prepared using a procedure analogous to that used in Example II, except in this case the reaction vessel was saturated with hydrogen at ambient pressure prior to adding the ethylene.

EXAMPLE IV

A series of polymerizations were conducted employing the catalysts of Examples I–III. The first two polymerization runs involved using catalyst of Example I. In one case, the polymerization was conducted in the absence of hydrogen and in the other case, the polymerization was conducted with hydrogen present. Another run was conducted using the catalyst of Example II wherein the polymerization was conducted in the absence of hydrogen. Still another polymerization was conducted using the catalyst of Example III, an inventive catalyst produced by prepolymerizing in the presence of hydrogen. The polymerization using the prepolymerized catalyst of Example III was conducted in the absence of hydrogen.

The general polymerization conditions used were a 10 bar ethylene pressure employing 500 mL of n-pentane diluent and 1 mL of a 1.6 molar solution of triisobutylaluminum in n-hexane. The polymerization temperature was 70° C. The aluminum to zirconium ratio was about 260:1.

The results of these polymerizations are summarized in the following table. In the following table, the molecular weights were determined using high temperature gel permeation chromatography and universal calibration.

TABLE

| Catalyst No. | $H_2$ | Activity [kg PE/g Zr-h] | $M_n/10^3$ [g/mol]$^{a)}$ | $M_w/10^3$ [g/mol]$^{a)}$ | $M_n/10^3$ [g/mol]$^{a)}$ | $M_w/M_n$ | $T_m[°C]$ $\Delta H_m[J/g]$ $\alpha [\%]$ |
|---|---|---|---|---|---|---|---|
| SiO$_2$-PHT I | — | 518 | 348 | 399 | 109 | 3.66 | 139.1 / 133.9 / 45 |
| SiO$_2$-PHT I | in the reactor | 240 | 74 | 117 | 11.3 | 10.4 | 136.6 / 165.7 / 57 |
| SiO$_2$-PHT prepolymerized II | — | 810 | 211 | 252 | 57.9 | 4.35 | 137.3 / 139.9 / 48 |
| SiO$_2$-PHT prepolymerized III | during prepolymerization | 670 | 296 | 396 | 57.2 | 6.93 | 136.7 / 154.5 / 53 |

The results presented in the table reveal that when the catalyst of Example I is employed with hydrogen being used during the polymerization, there is a significant reduction in the productivity and a reduction in the molecular weight of the polymer. In addition, the molecular weight distribution is broadened significantly.

When the prepolymerized catalyst system of Example II is employed in polymerization in the absence of hydrogen, a catalyst is obtained which has a higher activity than the unprepolymerized catalyst of Example I. However, the polymer had a lower molecular weight and a broader molecular weight distribution.

Using the inventive catalyt system without hydrogen during the polymerization, one obtains a productivity somewhat between that of the unprepolymerized catalyst and the catalyst that was prepolymerized in the absence of hydrogen. Also, surprisingly, the molecular weight of the polymer produced using the inventive catalyst system was greater than that of the polymer produced using the catalyt system of Example II. An analysis of the gel permeation chromatograph of the polymer produced with the inventive cocatalyst exhibited several shoulders in the curve. This would lead one to believe that the catalyst system has a number of active sites.

That which is claimed is:

1. A process for producing a solid polymerization catalyst comprising
    (a) contacting a support base with an organoaluminum compound in an organic liquid diluent,
    (b) contacting the solid of step (a) with an activity promoting amount of water,
    (c) contacting the solid of step (b) with at least one metallocene to produce a solid catalyst system, and
    (d) subjecting the solid catalyst system to prepolymerization in the presence of hydrogen.

2. A process according to claim 1 wherein step (b) is carried out by adding water to the reaction mixture resulting from step (a).

3. A process according to claim 2 wherein said support base is selected from the group consisting of starch, flour, cellulose, silica, alumina, aluminum trifluoride, boron oxide, polyethylene, 1,5-hexanediol, and silica/alumina zeolites.

4. A process according to claim 3 wherein said organoaluminum compound is a trialkylaluminum.

5. A process according to claim 3 wherein said organoaluminum compound is trimethylaluminum.

6. A process according to claim 5 wherein the water is added to the reaction mixture resulting from step (a) in the form of water dispersed in an inert gas that is passed into said reaction mixture.

7. A process according to claim 6 wherein said support base is silica having no more than 1 weight percent water.

8. A process according to claim 5 wherein said support base is starch having no more than 1 weight percent water.

9. A process according to claim 2 wherein the solid resulting from step (b) is recovered, washed, and dried before being contacted with said metallocene.

10. A process according to claim 2 wherein step (c) is carried out by adding the metallocene to the reaction mixture resulting from step (b).

11. A process according to claim 10 wherein said support base is dried silica.

12. A process according to claim 5 wherein the metallocene is selected from metallocenes having at least one polymerizable substituent.

13. A process according to claim 12 wherein the metallocene 5-(cyclopentadienyl)-5-(9-fluorenyl)-1-hexene zirconium dichloride is employed in step (c).

14. A process according to claim 1 wherein the metallocene 5-(cyclopentadienyl)-5-(9-fluorenyl)-1-hexene zirconium dichloride is employed in step (c).

15. A process according to claim 1 wherein said at least one metallocene is selected from the group consisting of bis(n-butylcyclopentadienyl) zirconium dichloride, bis (cyclopentadienyl) zirconium dichloride, bis 1,2(9-fluorenyl) ethane zirconium dichloride, (9-methyl-9-5 fluorenyl) (cyclopentadienyl) zirconium dichloride, and 5-(9-fluorenyl)-5-(indenyl)-1-hexene zirconium dichloride.

16. An olefin polymerization catalyst produced by the process of claim 1.

17. A process for producing a polymer comprising contacting at least one olefin under polymerization conditions with the catalyst system of claim 16.

18. A process according to claim 17 wherein the polymerization is carried out under slurry conditions in a continuous loop reactor.

19. A process according to claim 18 wherein the catalyst system is prepared by preparing a slurry of silica in a liquid diluent, reacting the silica with trimethylaluminum, reacting that resulting solid with an activating amount of water, and then contacting the resulting solid with a metallocene.

* * * * *